(12) United States Patent
Brown

(10) Patent No.: US 9,955,144 B2
(45) Date of Patent: Apr. 24, 2018

(54) 3D DISPLAY SYSTEM

(71) Applicant: Lightscope Media LLC, Houston, TX (US)

(72) Inventor: Kedrick F. Brown, Houston, TX (US)

(73) Assignee: Lightscope Media, LLC, Houston, TX (US)

( * ) Notice: Subject to any disclaimer, the term of this patent is extended or adjusted under 35 U.S.C. 154(b) by 0 days.

(21) Appl. No.: 15/698,502

(22) Filed: Sep. 7, 2017

(65) Prior Publication Data

US 2018/0014007 A1 Jan. 11, 2018

Related U.S. Application Data

(63) Continuation-in-part of application No. 15/375,093, filed on Dec. 11, 2016, now Pat. No. 9,762,892.

(51) Int. Cl.
*H04N 13/04* (2006.01)
*G02B 27/22* (2018.01)
*G02B 26/08* (2006.01)

(52) U.S. Cl.
CPC ..... *H04N 13/0409* (2013.01); *G02B 27/2214* (2013.01); *H04N 13/0443* (2013.01); *G02B 26/0833* (2013.01)

(58) Field of Classification Search
CPC ........... H04N 13/0415; H04N 13/0427; H04N 13/0409; H04N 13/0413; H04N 13/0418; H04N 13/0406; H04N 13/0452; H04N 13/0459; H04N 13/0447; H04N 13/0443; H04N 13/0433; G02B 27/2264; G02B 27/2214; G02B 27/225; G02B 27/2278; G02B 26/0841; G09G 3/003; G09G 5/10; G02F 1/153; B81B 3/004; B81B 2201/033; B81B 3/0086; B81B 2201/042; B81B 2203/058
See application file for complete search history.

(56) References Cited

U.S. PATENT DOCUMENTS

| 3,704,055 | A | 11/1972 | Hong |
| 6,189,246 | B1 | 2/2001 | Gorthala |
| 6,628,041 | B2* | 9/2003 | Lee .......... B81B 3/004 |
| | | | 310/309 |

(Continued)

OTHER PUBLICATIONS

Jisoo Hong, et al., "3D/2D convertible projection-type integral imaging using concave half mirror array," Optical Society of America, Sep. 27, 2010 / vol. 18, No. 20 / Optics Express 20628, US.

(Continued)

*Primary Examiner* — Dramos I Kalapodas
(74) *Attorney, Agent, or Firm* — Louis Ventre, Jr.

(57) ABSTRACT

An apparatus for displaying auto-multiscopic 3D images includes a parallax barrier; an image source layer with a first side facing the rear surface of the parallax barrier; and an electromechanical system facing the second side of the image source layer. The parallax barrier comprises an array of transparent spots. The image source layer comprises at least one clear spot and is configured to emit light away from the parallax barrier. The electromechanical system comprises one or more mirrors pivotably mounted and controllable to reflect light towards the at least one clear spot in the image source layer.

10 Claims, 9 Drawing Sheets

(56) References Cited

U.S. PATENT DOCUMENTS

| | | | |
|---|---|---|---|
| 6,724,536 B2 | 4/2004 | Magee | |
| 6,837,585 B2 | 1/2005 | Roggatz | |
| 7,136,031 B2 | 11/2006 | Lee et al. | |
| 7,483,215 B2 | 1/2009 | Raymond | |
| 7,525,541 B2 | 4/2009 | Chun et al. | |
| 7,573,491 B2 | 8/2009 | Hartkop et al. | |
| 7,742,232 B2 | 6/2010 | Cho et al. | |
| 7,752,792 B2 | 7/2010 | Hsieh et al. | |
| 7,839,549 B2 | 11/2010 | Mihajlovic | |
| 7,843,449 B2 | 11/2010 | Krah | |
| 7,859,750 B2 | 12/2010 | Akiyama | |
| 7,978,407 B1 | 7/2011 | Connor | |
| 8,427,528 B2 | 4/2013 | Saishu et al. | |
| 8,749,722 B2 | 6/2014 | Uehara | |
| 8,823,641 B2 | 9/2014 | Kuhlman et al. | |
| 9,121,574 B2 | 9/2015 | Fidler et al. | |
| 9,146,403 B2 | 9/2015 | Lanman et al. | |
| 9,535,314 B2 | 1/2017 | Nelson | |
| 9,689,551 B2 | 6/2017 | Fidler et al. | |
| 9,817,233 B2 * | 11/2017 | Nakagawa | G02B 27/0101 |
| 2004/0001139 A1 | 1/2004 | Kobayashi | |
| 2008/0144174 A1 | 6/2008 | Lucente et al. | |
| 2009/0071050 A1 | 3/2009 | Hines | |
| 2010/0283838 A1 | 11/2010 | Tomisawa et al. | |
| 2012/0140131 A1 * | 6/2012 | Lanman | G02B 27/2214 349/15 |
| 2012/0182334 A1 * | 7/2012 | Ranieri | G02B 27/2214 345/694 |
| 2013/0082905 A1 | 4/2013 | Ranieri et al. | |
| 2013/0286053 A1 | 10/2013 | Fleck et al. | |
| 2013/0321776 A1 | 12/2013 | Loong | |
| 2014/0003762 A1 | 1/2014 | Macnamara | |
| 2014/0043370 A1 * | 2/2014 | Payne | H04N 13/0413 345/690 |
| 2014/0125894 A1 * | 5/2014 | Ranieri | G02B 27/2214 349/15 |
| 2014/0254007 A1 * | 9/2014 | Ma | G02B 27/2214 359/464 |
| 2014/0362314 A1 | 12/2014 | Guo et al. | |
| 2015/0293358 A1 | 10/2015 | de Matos Pereira Vieira et al. | |
| 2016/0048018 A1 | 2/2016 | de Matos Pereira Viera et al. | |
| 2016/0077336 A1 | 3/2016 | Hainich | |
| 2016/0209656 A1 | 7/2016 | Urey | |
| 2016/0295202 A1 | 10/2016 | Evans et al. | |

OTHER PUBLICATIONS

Guo-Jiao LV, et al., Reflected-light-source-based three-dimensional display with high brightness, Applied Optics, Journal 2016 Optical Society of America, 1559-128X/16/133452-04, Apr. 22, 2016, pp. 3452-3455, USA.

Rolf R. Hainich, Approaches to Ideal Freeform Mirror and Display Shapes for Augmented Reality, Freeform Mirrors and Displays for AR Preprint (version 1.0, Oct. 2016), online at http://www.theendofhardware.com/Freeform-NED-displays-RRH-preprint-v1-0.pdf, p. 8, Fig.9, USA.

"30/20 Convertible Projection-Type Integral Imaging Using Concave Half Mirror Array" Hong et al., Optics Express 20628 © 2010 OSA.

* cited by examiner

3D DISPLAY SYSTEM

CROSS-REFERENCE TO RELATED APPLICATION

This application is a continuation-in-part of application Ser. No. 15/375,093, filed 11 Dec. 2016, which is expected to be issued as U.S. Pat. No. 9,762,892 on 12 Sep. 2017.

TECHNICAL FIELD

In the field of television, an auto-multiscopic 3D display system with adjustable light-focusing capability is disclosed.

BACKGROUND ART

This invention provides improvements over the inventor's three earlier inventions: a first involving an auto-multiscopic 3D billboard display system, a second involving an auto-multiscopic 3D display system, and a third involving a system operating on light to capture images or produce a three-dimensional display.

The first invention is described in U.S. patent application Ser. No. 15/084,221 (the '221 application), filed 29 Mar. 2016, now U.S. Pat. No. 9,411,167 (the '167 patent), issued 9 Aug. 2016: The '221 application and the '167 patent are hereby incorporated by reference herein in their entirety. The '167 patent is for a billboard display system that utilizes a light source housed in a box-like structure. The light source shines light away from a non-transparent front wall and through a transparent rear wall and thence through a sheet of projection film having an array of images thereon and thence is reflected by a corresponding array of concave mirrors back to corresponding apertures. The apertures are formed at the bottom of indentations, preferably cone-shaped throughout the area of the front wall. The light passes through the apertures and thence out of the indentations to create a 3D image in the eyes of a viewer looking at the front wall.

The second invention is described in U.S. patent application Ser. No. 15/167,489 (the '489 application), filed 27 May 2016, now U.S. Pat. No. 9,491,444 (the '444 patent) on 8 Nov. 2016: The '489 application and the '444 patent are hereby incorporated by reference herein in their entirety. The '444 patent teaches an auto-multiscopic 3D display system utilizing one or more transparent organic light emitting diode (OLED) displays and Liquid Crystal Displays (LCDs) to enable full motion 3D displays. This display system is expected to display dynamic 3D images on flat screen televisions, monitors, tablets, smartphones, and other electronic display devices without any need for 3D enabling glasses. The term auto-multiscopic is used to define a display that allows multiple viewers to view three-dimensional scenes on a display, simultaneously and without the need for 3D glasses.

The third invention is described in U.S. patent application Ser. No. 15/375,093 (the '093 application), filed 11 Dec. 2016, expected to be U.S. Pat. No. 9,762,892 (the '892 patent), to be issued on 12 Sep. 2017. The '093 application and the '892 patent are hereby incorporated by reference herein in their entirety. The '093 application teaches an apparatus for displaying and/or capturing auto-multiscopic 3D images using a concave mirror array; a parallax barrier with an array of first transparent spots or lines extending through the parallax barrier; and a membrane between the opaque outer wall and the concave mirror array. The membrane is capable of displaying an intrinsic image when illuminated, sensing an image projected onto it, displaying an image projected onto it, and/or emitting light. The membrane includes a second transparent spot or line atop each first transparent spot or line respectively. A light source may illuminate the membrane and/or project an image onto the membrane. The reflective concave surface also may be configured to permit some light to pass through it and when so configured a second transparent solid and/or an image sensor may be placed behind the concave mirror array.

The present invention teaches improvements to the systems described in the '167 patent, the '444 patent and '093 application in order to provide a device operable for displaying auto-multiscopic 3D images using an electromechanical system with controllable mirrors that are not necessarily concave mirrors. These mirrors can reflect light on or off clear spots or lines in an image source layer located between the electromechanical system and a parallax barrier, which clear spots or lines are ideally aligned with corresponding transparent spots or lines in a parallax barrier that forms the front of the display system. In some embodiments, the size, shape, number and location of the transparent spots or lines in the parallax barrier can be changed.

SUMMARY OF INVENTION

A display system enables auto-multiscopic three-dimensional viewing and includes a parallax barrier that forms the front of the display system; an image source layer; and an electromechanical system. The parallax barrier is non-transparent except for an array of transparent spots, each of which allows light to pass out of the parallax barrier to a viewer. The image source layer is located behind the parallax barrier and contains at least one clear spot aligned with at least one transparent spot in the array of transparent spots on the parallax barrier. Preferably, the image source layer has an array of clear spots. The image source layer emits light away from the parallax barrier towards the electromechanical system, which is at the rear of the display system. The electromechanical system includes a mirror that is pivotably mounted and controllable to reflect light sent to the mirror from the image source layer towards the clear spot. Preferably the electromechanical system contains multiple such mirrors.

In optional embodiments: the parallax barrier is made with a liquid crystal display, the electromechanical system is made with a microelectromechanical system; the image source layer is made with a transparent organic light-emitting diode display; the mirror, or the array of mirrors, is configured for reorientation so as to reflect light towards or away from the clear spot; and the parallax barrier is capable of altering the locations, sizes, shapes or quantity of transparent spots in the parallax barrier.

Technical Problem

The auto-multiscopic 3D display systems in the earlier patents discussed above each include a concave mirror array. A concave mirror array located within an auto-multiscopic 3D display system facilitates the display of auto-multiscopic 3D images by reflecting light directed at it along trajectories moving away from the front of the display system back towards the front of the display system, which is a parallax barrier that is configured with an array of transparent spots or transparent lines. Some light reflected from the concave mirror array exits the display system through the transparent spots or transparent lines on the parallax barrier, resulting in the emission of reflected light from the display system. This emitted light creates a 3D image in the eyes of a viewer of the display system that looks at the outer surface of the parallax barrier.

Holographic optical elements capable of reflecting collimated incident light rays towards an array of focal points or focal lines may be substituted in some instances for a concave mirror array that has an array of focal points or focal lines respectively.

Two or more adjacent transparent spots on the prior display system's parallax barrier may lie along the same imaginary line, thus effectively forming a dotted or solid transparent line on the parallax barrier. Thus, in the present invention described herein, the use of the term "transparent spot" in conjunction with the parallax barrier is expressly intended to include the possibility of a transparent line being present on that parallax barrier. Similarly, the use of the term "clear spot" in conjunction with the image source layer is expressly intended to include the possibility of a clear line being present on that image source layer.

In auto-multiscopic 3D display systems mentioned in the prior patents, a concave mirror array in most embodiments is a physical structure with a fixed structural configuration. While possible, movable mirrors were not discussed. In embodiments without movable mirrors, the locations of a concave mirror array's focal points and/or focal lines would remain fixed over time relative to the concave mirror array. In these embodiments, the number of focal points and/or focal lines that the concave mirror array has, also remains fixed over time. Being fixed over time effectively means that the number of transparent spots or transparent lines on the display system's parallax barrier, and the locations of transparent spots or transparent lines on the display system's parallax barrier relative to the concave mirror array will also remain fixed over time to ensure that light traveling away from the front of the display system that is focused by the concave mirror array can efficiently exit the display system.

In those prior patent embodiments with a structural configuration of the concave mirror array (and the individual concave mirrors in it), the auto-multiscopic 3D display systems would be limited in their ability to continue properly functioning if the arrangement of transparent spots or transparent lines on any of their parallax barriers were to change.

Solution to Problem

The solution is an auto-multiscopic 3D display system having adjustable light reflecting capability so as to maintain its ability to efficiently focus light generated within the display system in embodiments with a capability to change the arrangement of transparent spots or transparent lines on the parallax barrier. The light that the display system focuses first travels in directions away from the front of the display system toward the rear of the display system, where the electromechanical system with one or more mirrors is located. The electromechanical system reflects and focuses the light so as to enable the reflected light to efficiently exit the front of the display system. This reflected light exits the display system even when the arrangement of transparent spots or transparent lines on the display system's parallax barrier, which forms the front of the display system, changes over time. The solution is thus an auto-multiscopic 3D display system with adjustable light-focusing capability.

Advantageous Effects of Invention

The display system disclosed herein includes components that can be made very thin so that the overall display system is able to have a thin form factor.

The present design enables use of readily available microelectromechanical systems using flat mirrors.

BRIEF DESCRIPTION OF DRAWINGS

The drawings illustrate preferred embodiments of the 3D display system according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
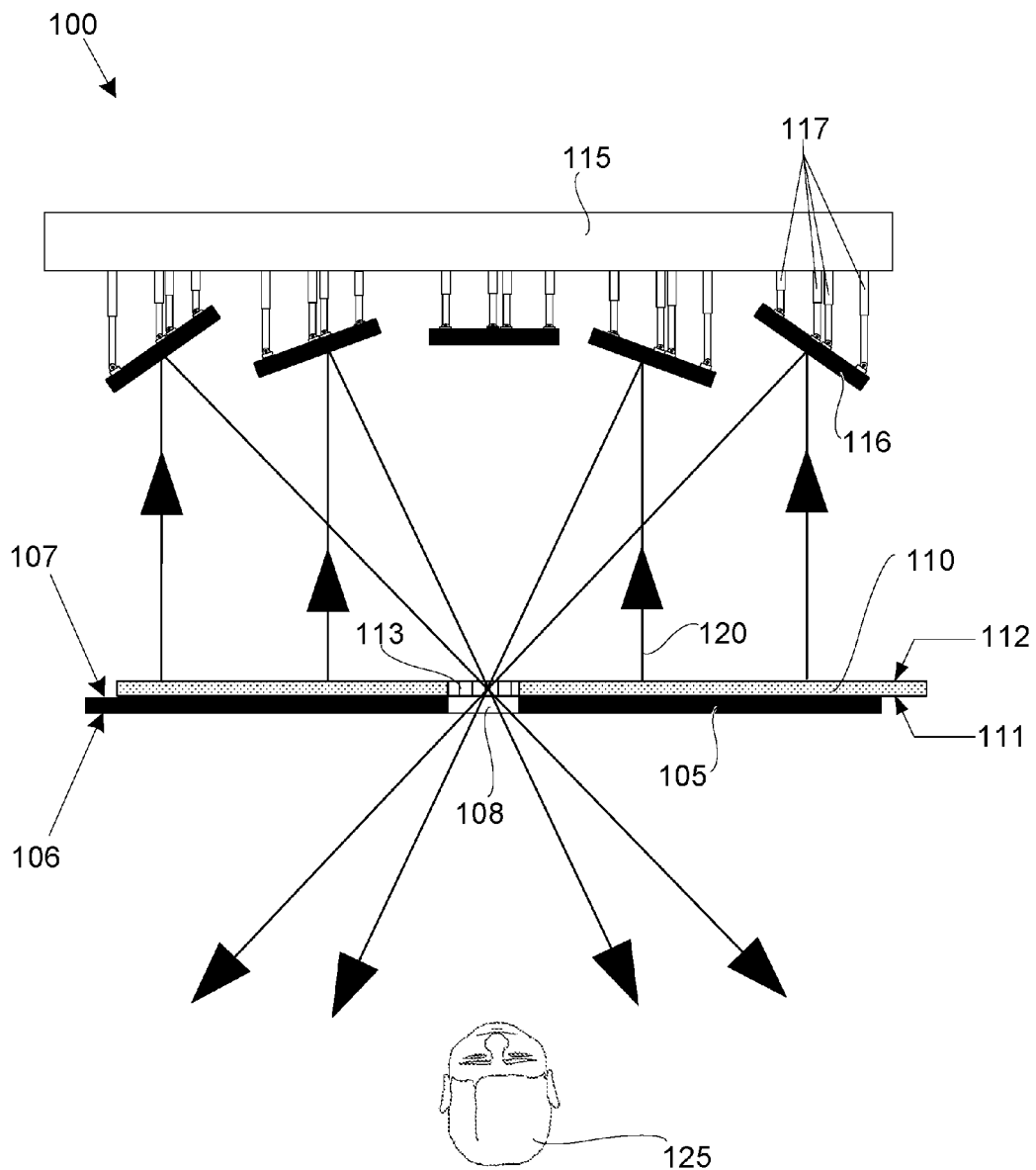
FIG. 1 is a top view of a preferred embodiment of the 3D display system showing three major components: a parallax barrier, an image source layer, and an electromechanical system.

FIG. 1 is a top view of a preferred embodiment of the 3D display system configured to enable auto-multiscopic three-dimensional viewing. It is also referred to herein as the display system (100). The display system (100) includes the three major components: a parallax barrier (105); an image source layer (110); and an electromechanical system (115). The display system (100) and each of the three major components are preferably in the shape of a three-dimensional (3D) orthotope, to wit, a right rectangular prism, rectangular cuboid, or rectangular parallelepiped. Other shapes, such as shapes having curved rather than flat surfaces, and shapes having curved rather than flat edges, may also be used.

The parallax barrier (105) has a front surface (106) and a rear surface (107). Preferably, the front surface (106) is the side of the parallax barrier (105) that is visible to a viewer (125) of the display system (100). Typically, the rear surface (107), and most components behind the front surface (106), would not be fully visible to a viewer (125), but rather would be enclosed within the display system (100), which, preferably is integrated in the shape of a 3D orthotope.

The parallax barrier (105) is preferably non-transparent except for an array of transparent spots (205). The effect is that most of the interior of the display system (100) should typically be blocked from the view of a viewer (125) looking at the front surface (106). The transparent spots in the parallax barrier should ideally have a tiny diameter (i.e. preferably less than a millimeter).

Preferably, each transparent spot (which may be a hole) in the array of transparent spots (205) allows light (120) to pass through the parallax barrier (105), especially light generated inside the display system (100) that is reflected by the electromechanical system (115) to the outside of the display system (100) where a viewer (125) looking at the front surface (106) can see it.

In a non-ideal configuration, the parallax barrier may be made of opaque physical material that does not easily permit the relocation of transparent spots in it. For example, the parallax barrier may be an opaque layer of metal, or a layer of vertically aligned carbon nanotube arrays (VANTAs) that is very light absorbent.

The parallax barrier (105) is optionally made of, that is includes, a liquid crystal display (805), which is capable of being non-transparent except for an array of transparent spots (205), as required. For example, the front surface (106) of the parallax barrier (105) may or may not be opaque (it may be clear glass), but, preferably, the parallax barrier (105) overall should be mostly opaque.

The parallax barrier (105) is optionally configured to enable relocation of at least one transparent spot (108) in the array of transparent spots (205). This capability may be provided by electronically controlling the transparency of pixels in the parallax barrier (105), such as for example, electronically changing particular pixels in a liquid crystal display (805) from non-transparent to transparent, or vice-versa.

Similarly, the parallax barrier (105) is optionally configured to enable adding or removing at least one transparent spot (108) in the array of transparent spots (205) on the parallax barrier (105). Preferably, the parallax barrier (105) is configured with pixels changeable from non-transparent to transparent or vice-versa. Concerning size, each transparent spot (108) preferably has an approximate diameter of 0.01 mm to 1 mm.

Similarly, the parallax barrier (105) is optionally configured to enable altering the size or shape of at least one transparent spot (108) in the array of transparent spots (205).

The display system (100) may be configured to electronically change the parallax barrier (105) by altering the size or shape of at least one transparent spot (108) in the array of transparent spots (205). This capability may be provided, for example, if the parallax barrier is a liquid crystal display that contains pixels configurable to be transparent or opaque, by electronically controlling the number and location of pixels in the parallax barrier (105) set for transparency. For example, a transparent spot could be expanded (requiring more pixels on the parallax barrier to be transparent) or shrunk (requiring fewer pixels on the parallax barrier to be transparent).

The image source layer (110) is also in the shape of a 3D orthotope, preferably having a thickness of less than one millimeter. The image source layer (110) may be structured so that it is directly adjacent to (or even touching) the parallax barrier (105). Alternatively, the image source layer (110) may be structured as a layer of pixels contained within a transparent organic light-emitting diode display (605). A transparent organic light-emitting diode display (605) is also known as a transparent OLED display. These structural design options essentially enable a combination of the parallax barrier (105) and the image source layer (110) to have a thin form factor, i.e. preferably having a combined thickness of less than one millimeter.

The image source layer (110) has two opposing sides, a first side (111) and a second side (112). The first side (111) preferably covers about the same area as the rear surface (107) of the parallax barrier (105) and the first side (111) faces the rear surface (107) of the parallax barrier (105) and, thus, most of its first side (111) surface area would not typically be visible to the viewer (125) due to its being obscured by non-transparent regions of the parallax barrier (105).

Figure 2:
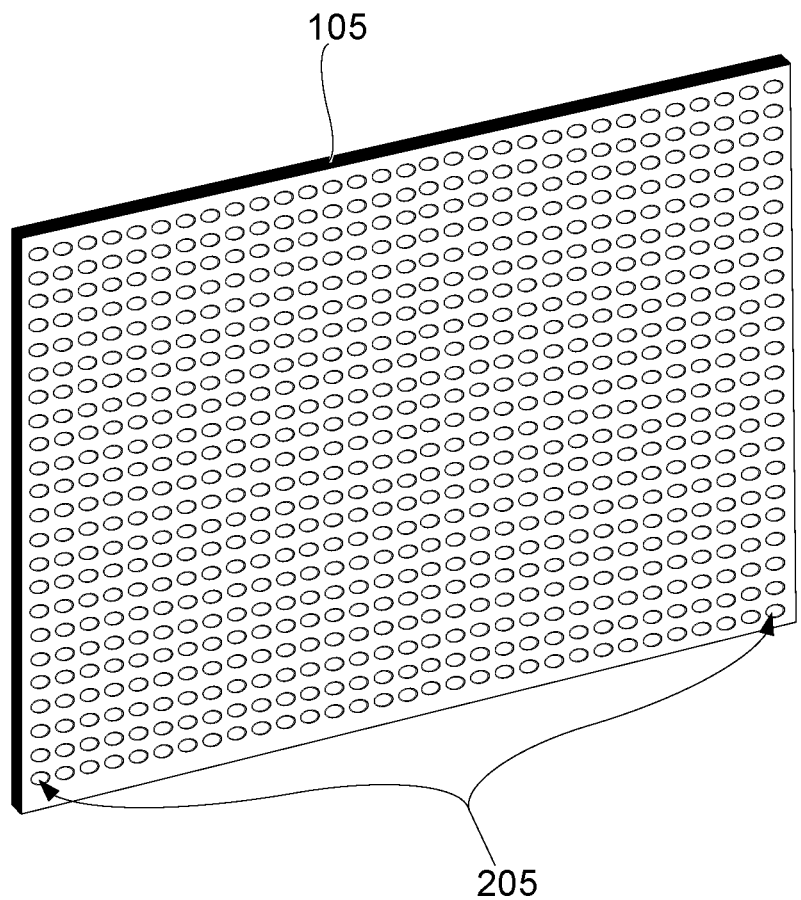
FIG. 2 is a perspective view of the parallax barrier showing an array of transparent spots.
Figure 3:
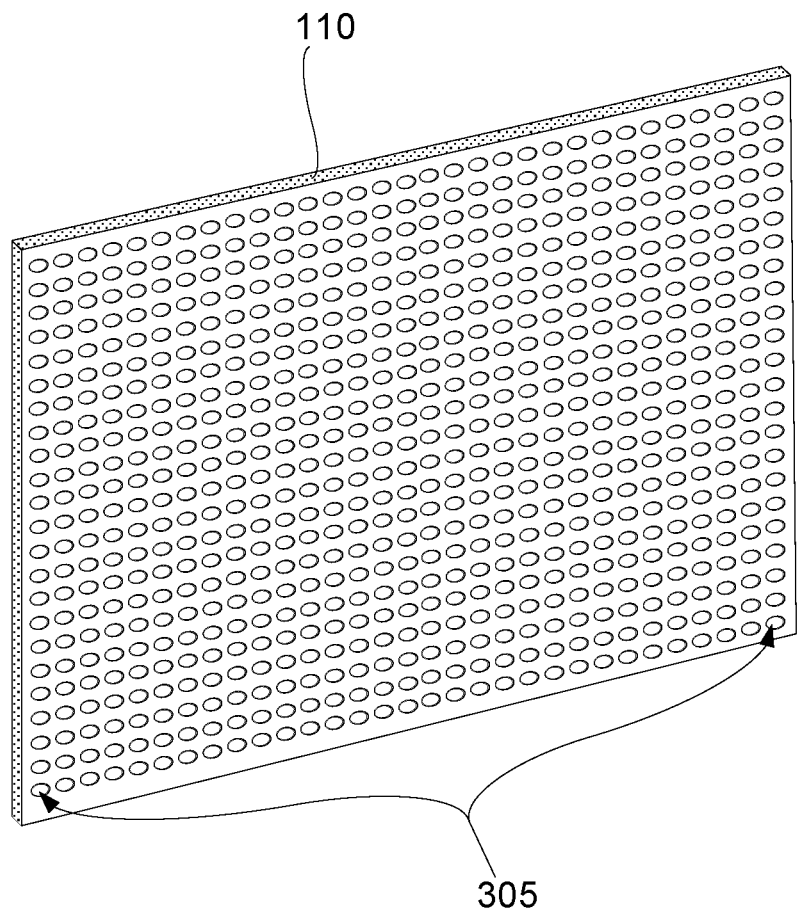
FIG. 3 is a perspective view of the image source layer showing an array of clear spots.

The image source layer (110) includes a clear spot (113), that is, one or more clear spots, aligned with one or more corresponding transparent spots in the array of transparent spots (205) (shown in FIG. 2) on the parallax barrier (105). Preferably, the image source layer (110) has an array of clear spots (305) (shown in FIG. 3) that may or may not exactly correspond in number and size to the transparent spots in the array of transparent spots (205) on the parallax barrier (105). There may be more clear spots in the image source layer (110) than transparent spots in the parallax barrier (105), or there may be fewer such clear spots. The clear spot (113), which may be a hole, allows light (120) to pass through the image source layer (110). Concerning size, each clear spot preferably has an approximate diameter of 0.01 mm to 1 mm.

The display system is preferably configured such that light that initially travels away from the parallax barrier, and is then reflected toward the image source layer (110) from locations behind the image source layer (110) from the perspective of the viewer (125), will be able to pass through the clear spot (113) and then pass through one or more of the transparent spots in the array of transparent spots (205) on the parallax barrier (105), thus enabling this light to exit the display system (100).

Although generating 3D images and displays are the primary uses for the display system (100), an optional use of the display system (100) is as a directional backlight, such as for example, when the image source layer (110) is controlled to emit uniformly colored light, such as white light.

When the image source layer (110) functions as a source of light (120), in contrast to when it simply allows light (120) to pass through it, then the image source layer (110)

is configured to emit light (120) in directions away from the parallax barrier (105). Preferably, all light (120) produced by the image source layer (110) is emitted in directions away from the parallax barrier (105).

The combined light-emitting and transparency capabilities of the image source layer (110) may be provided by using light sources such as one or more organic light-emitting diode pixels, as for example, in a transparent organic light-emitting diode display. The individual organic light-emitting diode pixels do not necessarily have to be transparent components themselves (or configurable for transparency), but can act as light sources in an otherwise transparent display, thus enabling the image source layer (110) to have combined light-emitting and transparency capabilities. In embodiments having such light sources, the light sources should ideally be configured to emit light (120) in directions away from the parallax barrier (105), that is, in directions away from a viewer (125) of the display system (100) looking at the parallax barrier (105).

The electromechanical system (115) includes a mirror (116), that is, at least one mirror, that is pivotably mounted (117) and controllable to reflect light (120) sent to the mirror (116) from the image source layer (110) towards the clear spot (113) on the image source layer (110). FIG. 1 illustrates a mirror (116) in an array of mirrors (405) (shown in FIG. 4 and FIG. 5) reflecting light from the image source layer (110) through the clear spot (113) in the image source layer (110) and an adjacent transparent spot (108) in the parallax barrier (105). The parallax barrier (105) forms the front surface (106) of the display system (100).

Figure 4:
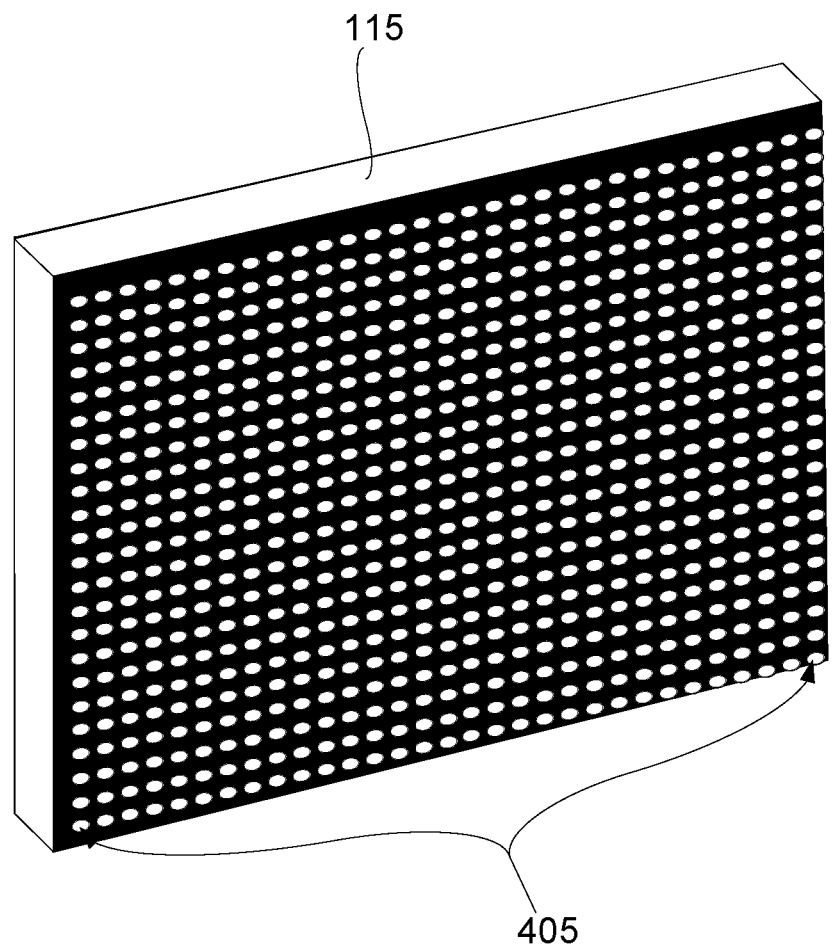
FIG. 4 is a perspective view of the electromechanical system showing an array of mirrors.
Figure 5:
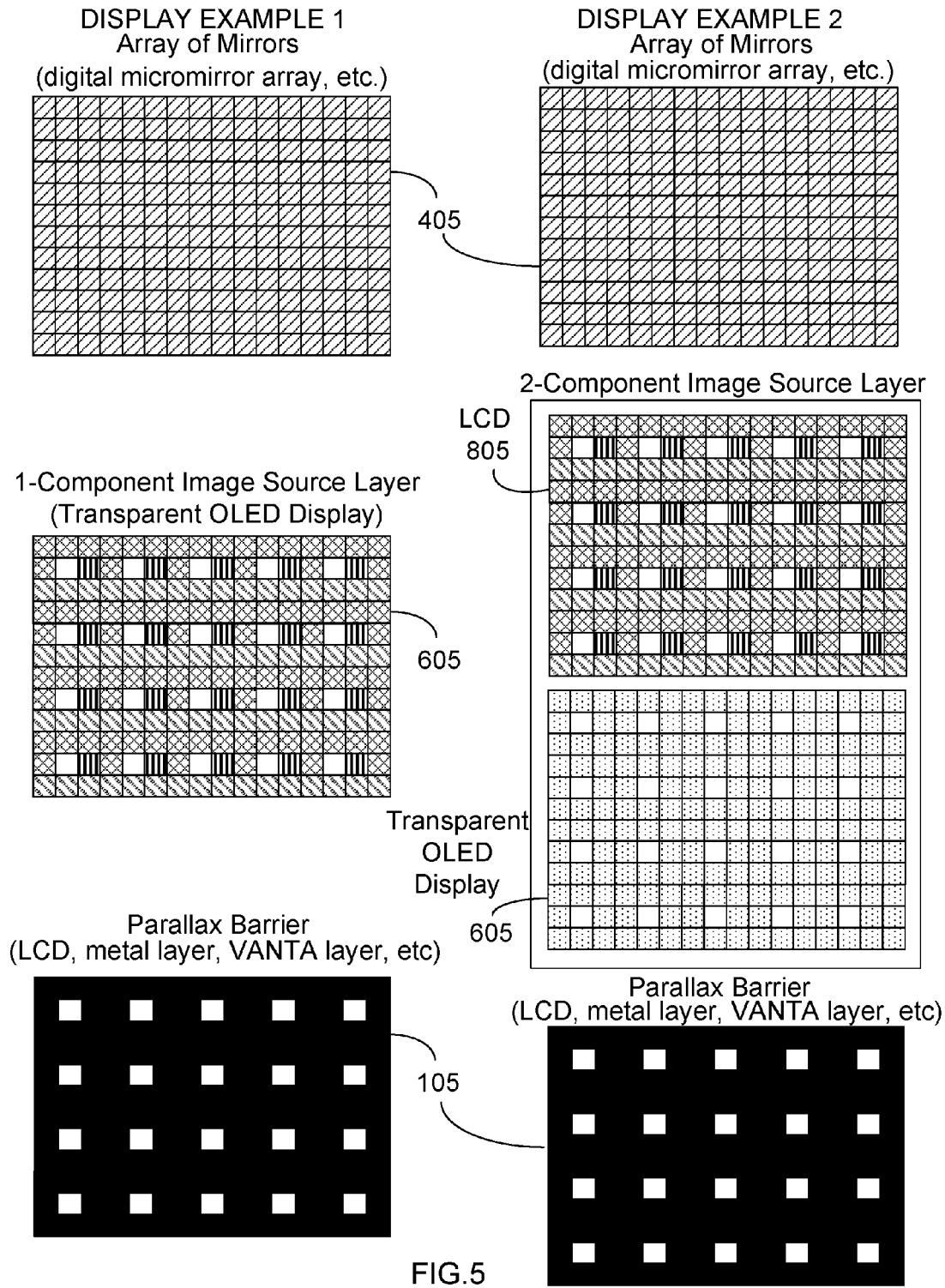
FIG. 5 is an illustration of two preferred embodiments of the 3D display system.

Preferably, the electromechanical system (115) includes an array of mirrors (405), illustrated in FIG. 4 and FIG. 5. In one embodiment, this array of mirrors (405) is a part of the electromechanical system (115) composed of mirrors having a length, width or diameter between 1 and 100 micrometers in size. In this configuration, the electromechanical system (115) may be referred to as a microelectromechanical system. For example, use of a microelectromechanical system in this configuration enables the display system (100) to be used in a head mounted display. Each mirror (116) in the array of mirrors (405) is pivotably mounted (117) and controllable to reflect light (120) from the image source layer (110) towards at least one of the clear spots in the array of clear spots (305). Preferably, each mirror (116) is configured and controllable to reflect light (120) emitted towards it from the image source layer (110) to more than one clear spot (305) on the image source layer (110). Structurally, this controllability feature means that the electromechanical system (115) is also configured to reorient the mirror (116) so as to reflect light (120) away from the clear spot (113).

Torsion beams, bars or hinges may be used, for example, in conjunction with electrostatic actuation, to facilitate the electromechanical rotation of the mirror towards a preferred spatial orientation that enables the mirror to reflect light emitted towards it by the image source layer (110) to the clear spot (113) in the image source layer (110).

Alternatively, such pivotably mounted mirrors could reflect light to the clear spot (113) in the image source layer (110) even if the distance between the array of mirrors (405) and the image source layer (110) is changed.

In an alternate configuration, linear actuators connected to the rear of the mirror, for example by ball joints, may be used to electromechanically rotate the mirror. Other methods to facilitate the electromechanical rotation of the mirror may also be used.

Example 1—Mirror Reorientation Due to Clear Spot Movement

Figure 6B:
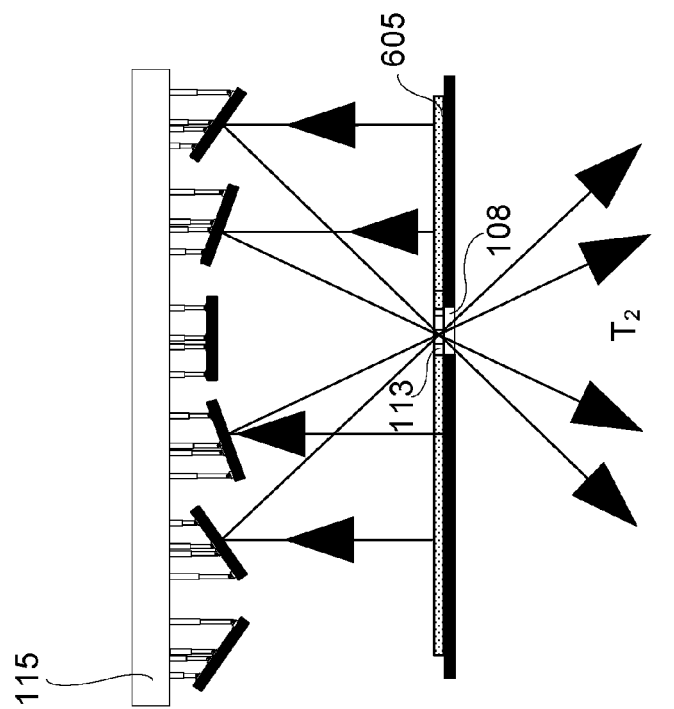
FIG. 6B is a top view showing the same array of mirrors shown in FIG. 6A, from the same perspective shown in FIG. 6A, in the electromechanical system, in a subsequent state at time T2, with the clear spot and transparent spot having been moved to a second location.
Figure 6B:
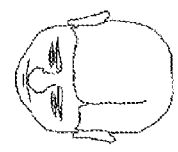
Figure 6A:
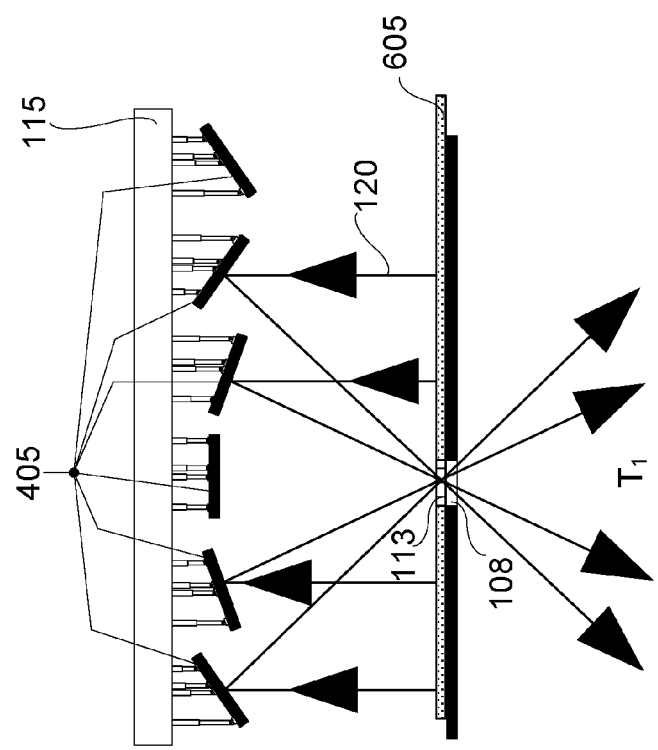
FIG. 6A is a top view showing the array of mirrors in the electromechanical system in an initial state at time T1 with the clear spot and transparent spot in a first location.
Figure 6A:
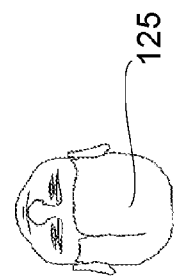

An exemplary embodiment is illustrated in FIG. 6A and FIG. 6B, showing an array of mirrors (405) in the electromechanical system (115). The array of mirrors (405) is configured for reorientation. FIG. 6A and FIG. 6B are respectively top views of a display system at two different times, T1 in FIG. 6A and T2 in FIG. 6B. These figures in comparison show the same 6 mirrors in the array of mirrors (405), from the same perspective, in a first state at time T1 in FIG. 6A and in a second subsequent state at time T2 in FIG. 6B. The mirrors are shown changing their orientations in conjunction with a change in the location of the clear spot (113) in a transparent organic light-emitting diode display (605) overlaying a transparent spot (108) in the parallax barrier (105), thus enabling light (120) reflected from the array of mirrors (405) to exit the display system (100) towards the viewer (125) at both times.

Example 2—Mirror Reorientation Due to Display System Component Separation

Figure 7A:
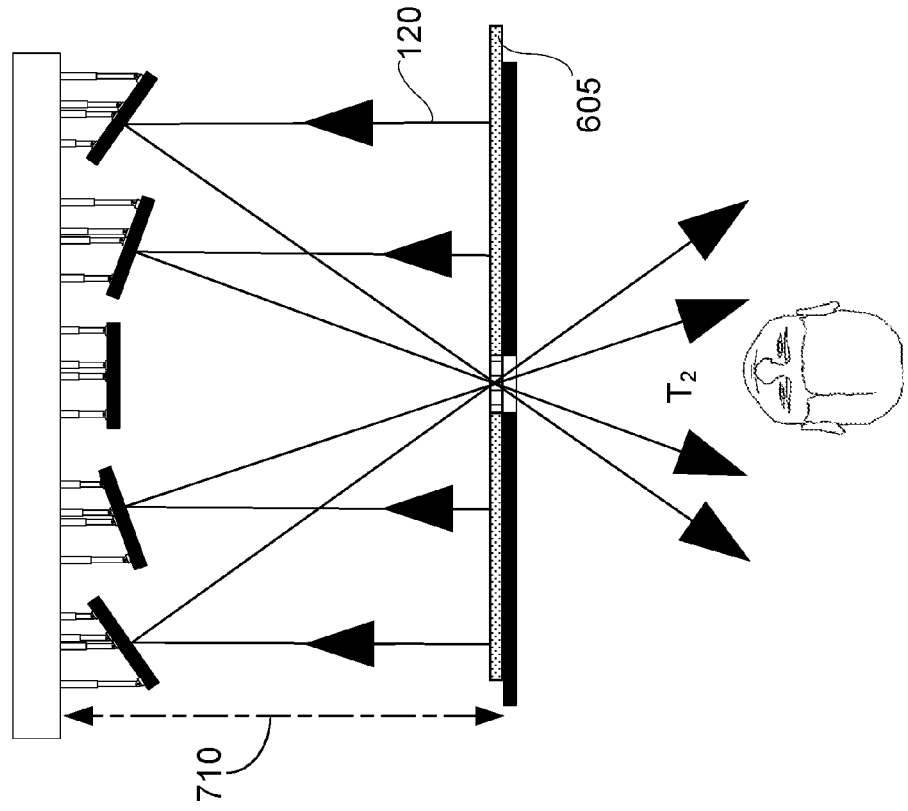
FIG. 7A is a top view showing the orientation of the array of mirrors in the electromechanical system in an initial state at time T1 with the image source layer and parallax barrier at a first distance from the array of mirrors.
Figure 7B:
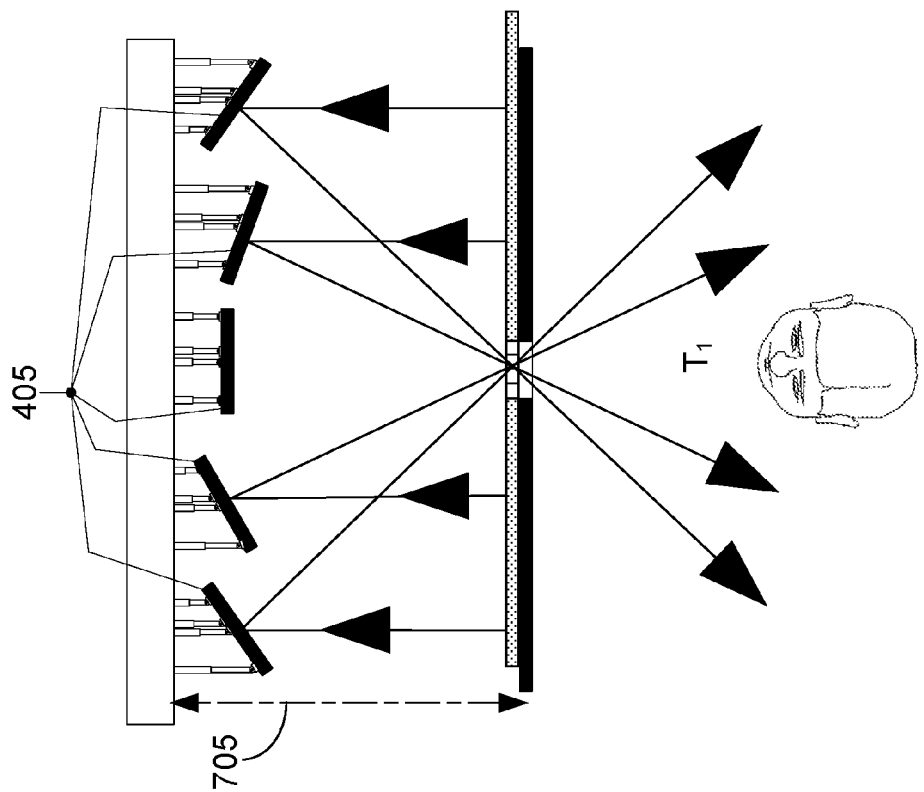
FIG. 7B is a top view showing the reorientation of the array of mirrors in the electromechanical system in a subsequent state at time T2, with the image source layer and parallax barrier having been moved to a greater distance from the array of mirrors.

An exemplary embodiment is illustrated in FIG. 7A and FIG. 7B, which show side by side top views of a display system at two different times, T1 in FIG. 7A and T2 in FIG. 7B. The combined figures show mirrors in the array of mirrors (405) changing their orientations in conjunction with the transparent organic light-emitting diode display (605) and the parallax barrier (105) being moved further away from the mirror array (i.e. from first position 705 at $T_1$ to second position 710 at $T_2$). The reorientation of the mirrors enables light (120) from the transparent OLED display (605) to exit the display system at both times.

Example 3—Transparent OLED Display Image Source Layer and LCD Parallax Barrier

Figure 8:
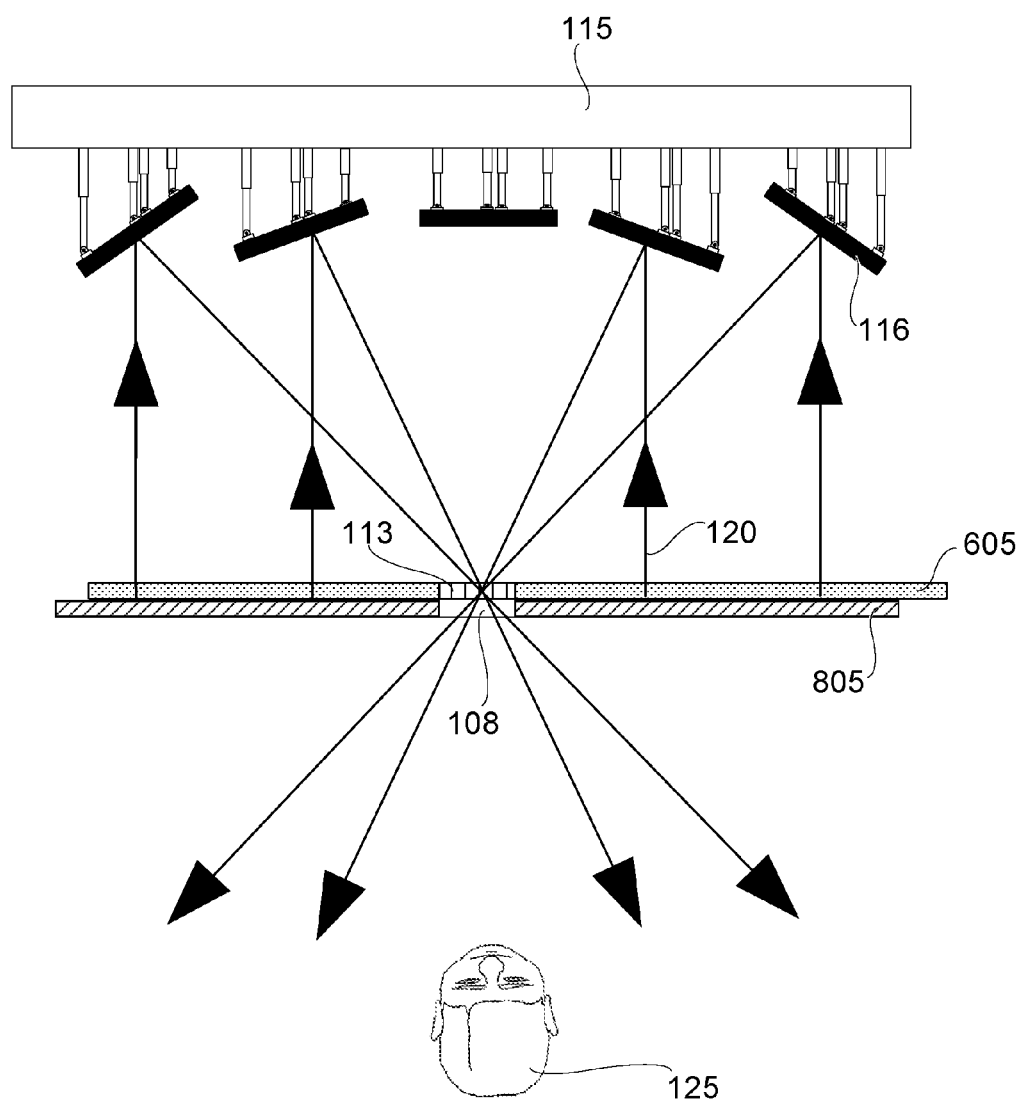
FIG. 8 is a top view of a display system where the parallax barrier is a liquid crystal display (LCD) and the image source layer is a transparent organic light-emitting diode display immediately behind the LCD.

An exemplary embodiment is illustrated in FIG. 8, which shows a top view of a display system where the parallax barrier is a liquid crystal display (805) (LCD), the image source layer is a transparent organic light-emitting diode display (605) (transparent OLED display) located immediately behind the LCD from the perspective of a viewer (125), and the electromechanical system (115) is located behind the LCD from the perspective of a viewer (125). Use of an LCD as the parallax barrier (105) enables a dynamic display in which the transparent spots in the array of transparent spots (205) on the parallax barrier (105) can be manipulated to change location. The mirrors in the array of mirrors (405) reflect the light emitted away from the LCD (i.e. the parallax barrier) by the transparent OLED display. The light (120) reflected from the array of mirrors (405) shines through the clear spot (113) in the transparent organic light-emitting diode display (605) and then passes through the transparent spot (108) in the LCD (i.e. the parallax barrier) and out to the viewer (125).

This exemplary embodiment enables the total surface area of the parallax barrier (105) that can be utilized for auto-multiscopic 3D image display to be increased relative to the case when only a small fraction of the parallax barrier's surface area (i.e. the total surface area covered by the transparent spots) is consistently utilized for auto-multiscopic 3D image display. For example, different portions of the same complex auto-multiscopic 3D image can be briefly displayed in rapid succession through an array of transparent spots on the parallax barrier that changes its location on the parallax barrier over time.

In an alternate example, a region of the image source layer from which the electromechanical system reflects light emitted towards it by the image source layer towards a single clear spot on the image source layer may sometimes be expanded even if the location of the clear spot, and a transparent spot on the parallax barrier that is adjacent to the clear spot, remain fixed over time.

For example, a region of the image source layer that contains more than one clear spot, each of which such clear spots is paired with a corresponding transparent spot on the parallax barrier, may be used to emit light towards the array of mirrors (405) that is then reflected towards only a single clear spot in the image source layer. By rapidly repeating this process to send light through different single clear spots on the image source layer, an overall auto-multiscopic 3D image can be displayed in which individual transparent spots on the parallax barrier show more image detail than would be possible if reflected light was sent through all such clear spots on the image source layer simultaneously.

Example 4—Central Mirror Rotation

Figure 9:
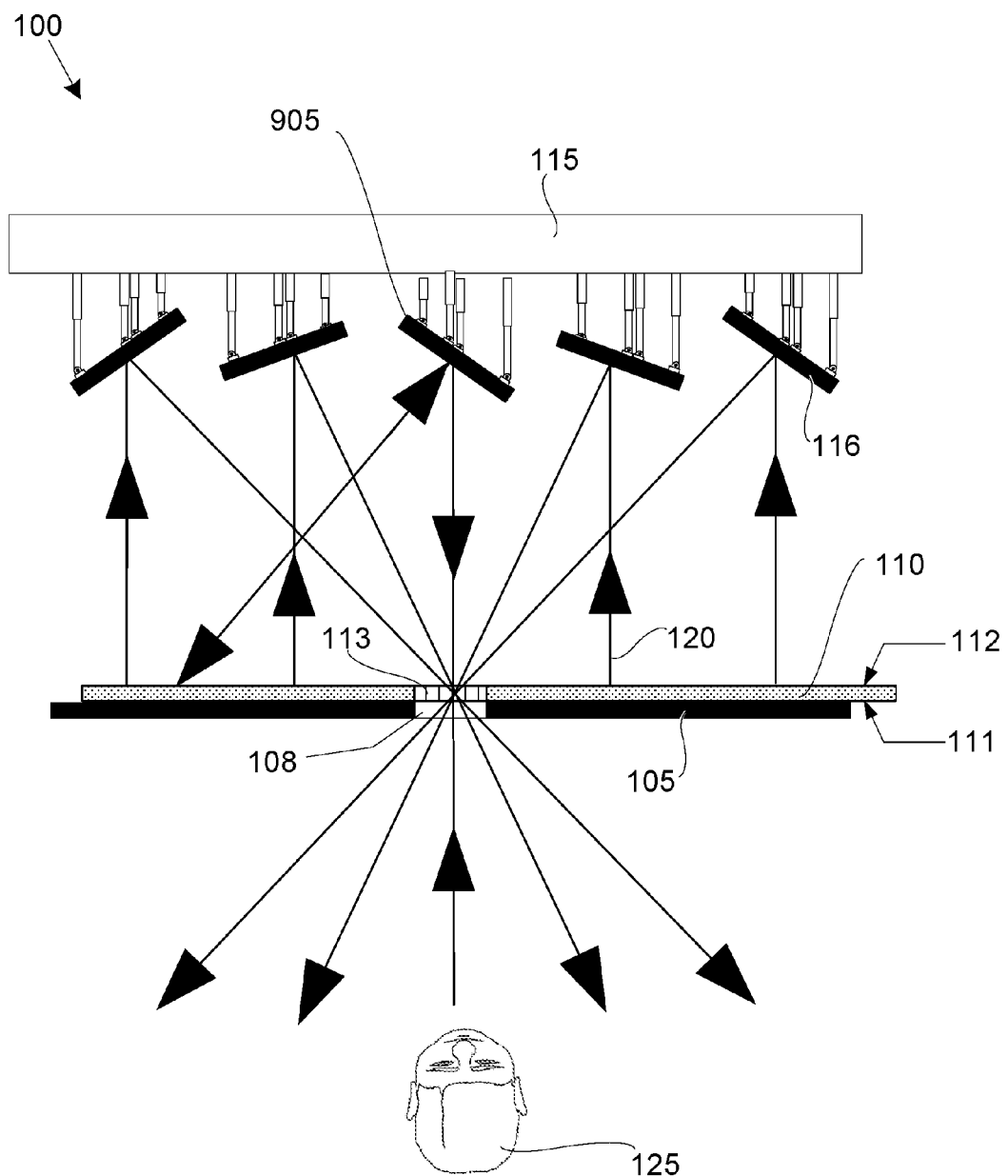
FIG. 9 is a top view of a display system showing a central mirror having been rotated to either reflect stray ambient light that reaches the array of mirrors along a trajectory perpendicular to the parallax barrier's outer surface, or to reflect light from the image source layer directly out of the display system along a trajectory perpendicular to the parallax barrier's outer surface, also referred to as the front surface of the parallax barrier.

FIG. 9 shows a top view of a display system (100) with a central mirror (905) rotated to reflect stray ambient light that reaches the array of mirrors (405) through the transparent spot (108) on the parallax barrier (105), traveling along a trajectory perpendicular to the front surface (106) of the parallax barrier (105), into a region of the display system (100) where it can be absorbed. If such stray ambient light is reflected into a specific location on the image source layer by the central mirror (905), then the image source layer may also be prevented from emitting light at that location, thus helping in turn to prevent stray light from the image source layer from exiting the display system.

FIG. 9 also shows that the central mirror (905) may be used to reflect light emitted by the image source layer (110) along trajectories that are not perpendicular to the second side (112) of the image source layer (110), directly out of the transparent spot (108) along trajectories that are perpendicular to the front surface (106) of the parallax barrier (105). In this case, for example, the reflective surface of a mirror that lies along a trajectory perpendicular to the second side (112) of the image source layer (110), that originates at the same location on the image source layer from which the above-mentioned light is emitted, may optionally be configured to reflect light from the image source layer directly back at the image source layer (not shown in FIG. 9). This would prevent light originating from this location on the image source layer from exiting the transparent spot (108) along a trajectory that is not perpendicular to the front surface (106) of the parallax barrier (105).

Example 5—3-Component and 4-Component Display Systems

FIG. 5 shows front views of each component removed from two display systems showing operable components vertically oriented for a 3-component display system and a 4-component display system.

The left column of FIG. 5 is a first exemplary embodiment titled "DISPLAY EXAMPLE 1." This first exemplary embodiment is a 3-component display system with a front component being the parallax barrier (105), the next component to the rear being the image source layer (110) and the rear-most component being the electromechanical system (115).

The right column of FIG. 5 is a second exemplary embodiment titled "DISPLAY EXAMPLE 2." The second exemplary embodiment is a 4-component display system where the image source layer (110) is made with two components: a liquid crystal display (805), aka an LCD, and a transparent organic light-emitting diode display (605), aka a transparent OLED display, that is ideally adjacent to the LCD. The other two components are the same as in "DISPLAY EXAMPLE 1. The transparent OLED display in this example ideally emits white light in directions away from the parallax barrier. The LCD and the transparent OLED display each contain one or more clear spots that are aligned with each other, thus forming one or more clear spots extending through the image source layer (110). In operation of the display system, white light from the transparent OLED display illuminates the LCD, which is ideally capable of displaying color images when illuminated. Light then travels from the LCD to the array of mirrors (405), which is a part of the electromechanical system (115). The array of mirrors (405) reflects light back towards clear spots in the image source layer (110). The reflected light then passes through the clear spots and from there it passes through transparent spots in the array of transparent spots (205) on the parallax barrier (105) and out of the display system (100).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the television and image display industries.

What is claimed is:

1. A display system configured to enable auto-multiscopic three-dimensional viewing, the display system comprising: a parallax barrier; an image source layer; and an electromechanical system;

the parallax barrier, comprising a front surface and a rear surface, the front surface visible to a viewer of the display system;

the parallax barrier being non-transparent except for an array of transparent spots;

each transparent spot in the array of transparent spots allows light to pass through the parallax barrier;

the image source layer:

comprising two opposing sides, a first side and a second side, the first side facing the rear surface of the parallax barrier; and comprising a clear spot aligned with one or more corresponding transparent spots in the array of transparent spots on the parallax barrier, which clear spot allows light to pass through the image source layer;

configured to change a location of the clear spot; and configured to emit light away from the parallax barrier;

the electromechanical system comprising a mirror that is pivotably mounted, the mirror controllable to reflect light sent to the mirror from the image source layer and to follow the location of the clear spot.

2. The display system of claim 1, wherein the parallax barrier comprises a liquid crystal display.

3. The display system of claim 2, wherein the electromechanical system comprises a microelectromechanical system.

4. The display system of claim 2, wherein the image source layer comprises a transparent organic light-emitting diode display.

5. The display system of claim 4, wherein the electromechanical system comprises a microelectromechanical system.

6. The display system of claim 1, further configured so that:
   the image source layer further comprises an array of clear spots;
   the electromechanical system further comprises an array of mirrors; and
   each mirror in the array of mirrors is pivotably mounted and controllable to reflect light from the image source layer towards at least one of the clear spots in the array of clear spots.

7. The display system of claim 1, wherein the mirror is configured for reorientation so as to reflect light away from the clear spot.

8. The display system of claim 1, wherein the parallax barrier is configured to enable relocation of at least one transparent spot in the array of transparent spots.

9. The display system of claim 1, wherein the parallax barrier is configured to enable adding or removing at least one transparent spot in the array of transparent spots on the parallax barrier.

10. The display system of claim 1, wherein the parallax barrier is configured to enable altering the size or shape of at least one transparent spot in the array of transparent spots.

* * * * *